United States Patent

[19]

Hitz

[11] Patent Number: 6,031,220

[45] Date of Patent: Feb. 29, 2000

[54] NO TOUCH MACHINE TRIGGER SYSTEM

[75] Inventor: Gary A. Hitz, New Cumberland, Pa.

[73] Assignee: Berg Technology, Inc., Reno, Nev.

[21] Appl. No.: 09/107,207

[22] Filed: Jun. 29, 1998

[51] Int. Cl.[7] .............................. H01J 40/14; B23B 39/04
[52] U.S. Cl. .............................. 250/221; 250/239; 408/11
[58] Field of Search ................................ 250/221, 239; 318/480; 408/8, 11, 13

[56] References Cited

U.S. PATENT DOCUMENTS

| | | | |
|---|---|---|---|
| 2,187,012 | 1/1940 | Brenner | 250/41.5 |
| 3,621,268 | 11/1971 | Friedrich et al. | 250/221 |
| 3,904,529 | 9/1975 | Nakamura | 250/561 |
| 3,912,925 | 10/1975 | Gaskell | 250/227 |
| 4,027,982 | 6/1977 | Ohisihi | 356/237 |
| 4,493,996 | 1/1985 | Sterling | 250/227 |
| 4,502,823 | 3/1985 | Wronski et al. | 409/134 |
| 4,563,577 | 1/1986 | Schaller | 250/221 |
| 4,572,948 | 2/1986 | Brooks | 250/227 |
| 4,598,199 | 7/1986 | Hentschel et al. | 250/222.1 |
| 4,704,656 | 11/1987 | Neiger | 361/173 |
| 4,727,248 | 2/1988 | Meur et al. | 250/239 |
| 4,878,729 | 11/1989 | Steward | 350/96.18 |
| 4,903,337 | 2/1990 | Newell et al. | 455/605 |
| 4,939,358 | 7/1990 | Nerman et al. | 250/221 |
| 5,031,987 | 7/1991 | Norling | 250/227.21 |
| 5,077,467 | 12/1991 | Barron, Jr. et al. | 250/221 |
| 5,133,030 | 7/1992 | Lee | 385/19 |
| 5,162,968 | 11/1992 | Neiger | 361/173 |
| 5,367,158 | 11/1994 | Herman et al. | 250/221 |
| 5,397,890 | 3/1995 | Schueler et al. | 250/221 |
| 5,410,148 | 4/1995 | Barron, Jr. et al. | 250/221 |
| 5,451,770 | 9/1995 | Steward | 250/221 |
| 5,472,298 | 12/1995 | Mihai | 408/13 |
| 5,529,441 | 6/1996 | Kosmonski et al. | 408/1 R |
| 5,594,238 | 1/1997 | Endruschat et al. | 250/221 |
| 5,633,975 | 5/1997 | Gary | 385/147 |
| 5,637,863 | 6/1997 | O'Hara | 250/221 |
| 5,656,900 | 8/1997 | Michel et al. | 318/286 |

*Primary Examiner*—Stephone B. Allen
*Attorney, Agent, or Firm*—Woodcock Wasburn Kurtz Mackiewicz & Norris LLP

[57] ABSTRACT

A no touch machine trigger system which triggers the associated machine into operation without the aid of a foot switch or other external device(s) actuated by an operator. The target area of the trigger system is conical in shape so as to guide the trigger mechanism to a fiber optic sensor at the apex of the cone shaped target area. The machine is not activated until the light across the apex of the cone is interrupted by the trigger mechanism, which does not occur until the trigger mechanism is properly oriented for the machine's operation. The trigger system is placed inside the machine where the operator cannot cause an inadvertent trigger. The trigger system is ideally suited to implementation in a wire stripping device, where the trigger mechanism is a wire to be stripped. The cone shaped target area has an oblique angle so that wires of a variety of sizes may be used to trigger the wire stripping device without adjustment.

5 Claims, 2 Drawing Sheets

NO TOUCH MACHINE TRIGGER SYSTEM

BACKGROUND OF THE INVENTION

1. Field of the Invention

The present invention relates to machine trigger system which triggers a machine into action without operator intervention and, more particularly, to a no touch machine trigger system for a wire stripper assembly which uses a fiber optic detection system to detect the presence of the wire to be stripped and assures proper orientation of the wire before automatically triggering the stripper mechanism.

2. Description of the Prior Art

Devices are known which automatically strip the protective shielding from a wire and apply a connector thereto. Such devices require the wire to be stripped to be inserted into the stripping assembly, usually via a tapered section which guides the wire to a triggering mechanism in the target area which causes a gripper mechanism to grip and strip the wire and a connector applicator to apply a connector to the stripped wire. In the prior art, the triggering mechanism typically comprises an air trigger at the end of the target area. The air trigger includes a paddle at the end of the target area, an air hole, and a ball bearing. During operation, the wire is inserted into the target area far enough to move the paddle at the end of the target area, the paddle is moved away from the wire so as to push a ball bearing to cover the air hole, and the resulting back pressure causes the stripper assembly to be activated. Unfortunately, trigger mechanisms of this type can only be used with relatively large gauge wires since small wires may be insufficient to move the paddle and the ball bearing to trigger the stripper assembly. Also, since the paddle moves when the wire is inserted sufficiently far, it is possible that the wire will be out of alignment when the stripper assembly is actuated.

Other triggering devices for wire stripper assemblies address the above problem by using an air-cone sensor mechanism which is situated such that an inserted wire blocks the air flow so as to cause the necessary back pressure to trigger the stripper assembly. Unfortunately, such an arrangement is also dependent on the gauge of the wire, for small gauge wires may be too small to block the air flow well enough to cause enough back pressure to trigger the stripper mechanism. Also, if the wire is not cut cleanly, then the triggering device will not work properly.

In other art areas, it is generally known to use the interruption of a light signal as a trigger mechanism. For example, Hentschel et al. disclose in U.S. Pat. No. 4,598,199 a safety device for controlling a laser so that the laser is only activated when an optical fiber is connected to the laser. Connection of the optical fiber is detected by a photodetecting circuit which detects light (or stops detecting light) only when the optical fiber is coupled to the laser.

Numerous other safety devices are known which use the interruption of light to trigger machines at a time when the operator is safely away from the moving parts of the machines or to deactivate machines when the operator moves into a danger zone. However, the present inventor is not aware that any of these devices is triggered by an object being processed by the machine (i.e., an object other than a body portion of the operator) where the object is inserted into a target area for activating the machine so as to insure proper alignment of the object before actuation. The present invention is designed to meet this need in the art.

More particularly, an improved trigger mechanism for a wire stripper device is desired which is independent of the gauge of the wire and which aligns the wire in the proper orientation when the stripper mechanism is actuated. The present invention has been designed to address these needs in the art as well.

SUMMARY OF THE INVENTION

The present invention eliminates the above-mentioned problems by providing a no touch machine trigger system which triggers the associated machine into operation without the aid of a foot switch or other external device(s) actuated by an operator. The target area of the trigger system is conical in shape so as to guide the trigger mechanism to a fiber optic sensor at the apex of the cone shaped target area. The machine is not activated until the light across the apex of the cone is interrupted by the trigger mechanism, which does not occur until the trigger mechanism is properly oriented for the machine's operation. The trigger system is placed inside the machine where the operator cannot cause an inadvertent trigger.

In a preferred embodiment, the trigger system of the invention is implemented in a wire stripping device, where the trigger mechanism is a wire to be stripped. The target area is shaped like a cone with an oblique angle so that wires of a variety of sizes may be used to trigger the wire stripping device without adjustment. The cone guides the wire to the center of the target area for the optical detector so that the wire stripping device will not be activated until the wire is centered in the target area so as to break the light beam in the apex of the cone, thereby preventing a trigger malfunction.

BRIEF DESCRIPTION OF THE DRAWINGS

The above and other objects and advantages of the invention will become more apparent and more readily appreciated from the following detailed description in connection with the attached drawings, of which.

DETAILED DESCRIPTION OF THE PRESENTLY PREFERRED EMBODIMENTS

A trigger system which satisfies the above-mentioned objects and advantages of the invention will now be described with reference to FIGS. 1–3. Those skilled in the art will appreciate that the description given with respect to those figures is for purposes of description only and is not intended in any way to limit the scope of the invention. The proper scope of the invention may be determined by referring to the appended claims.

Figure 1:
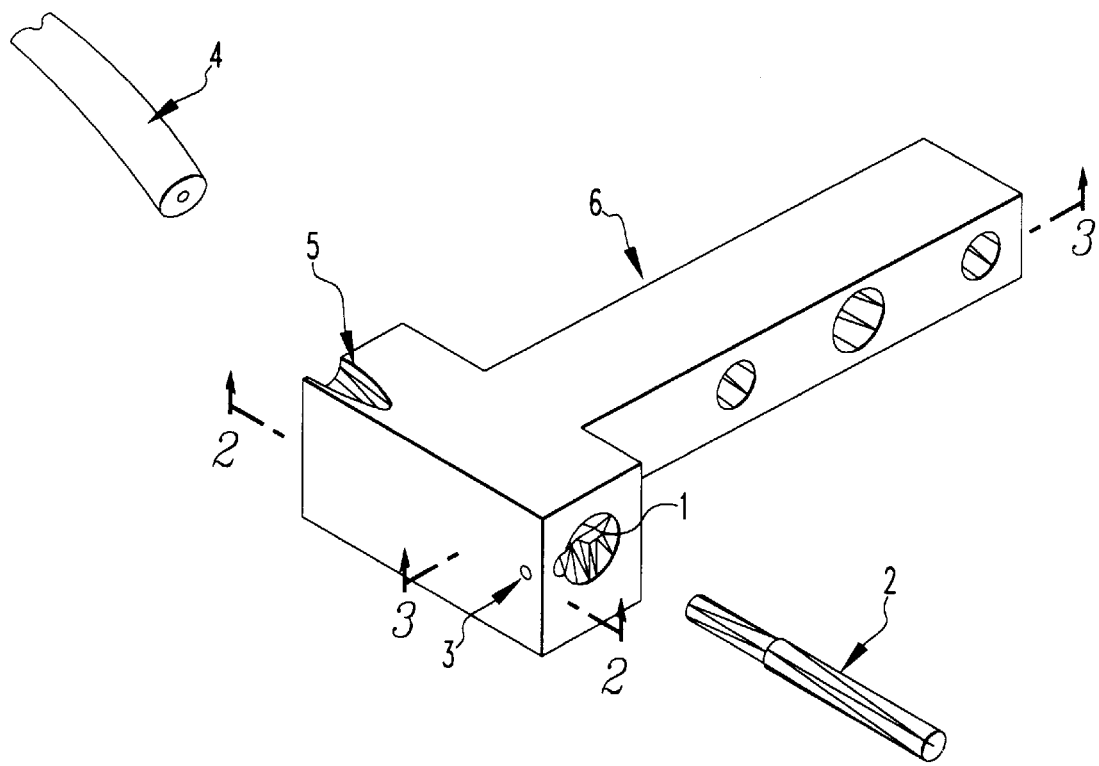
FIG. 1 illustrates a perspective view of a no touch triggering system for a wire stripping device in accordance with a preferred embodiment of the invention.

FIG. 1 illustrates a no touch machine trigger system which triggers the associated machine into operation without the aid of a foot switch or other external device(s). The illustrated trigger system is designed so that the target area 1 of the trigger system accepts a trigger mechanism or object 2 which excites the associated machine into operation upon entry of the trigger mechanism 2 into the target area 1. The target area 1 is conical in shape so as to guide the trigger mechanism 2 to the detection beam location 3 of a fiber optic cable sensor 4 inserted into an opening 5 in the housing 6 so that detection beam location 3 is at the apex 7 (FIGS. 2 and 3) of the target area 1. The associated machine is not activated until the light at the detection beam location 3 of the target area 1 is interrupted by the trigger mechanism 2, which does not occur until the trigger mechanism 2 is properly oriented for the machine's operation. As shown in FIG. 2, the conical shaped target area 1 preferably has sides which meet at the apex 7 at an oblique angle, preferably around 120° or more, so that a wide range in width or diameter of trigger mechanisms 1 may be accommodated without requiring an adjustment of the triggering system or changing the target. Preferably, the trigger system is placed inside the machine where the operator cannot cause an inadvertent trigger and resultant injury.

The fiber optic cable sensor 4 includes a fiber optic cable which is used as the interface between the associated machine and its control unit. Depending on the usable area for the target area 1, the fiber optic cable sensor 4 can be either a "through beam" sensor in which the light passes through the target area and is detected on the other side of the target area by a photodetector, or a "reflective" type sensor in which the light is reflected back to the fiber optic cable sensor 4 for detection. The reflective type of fiber optic cable sensor 4 is illustrated in the figures.

Figure 2:
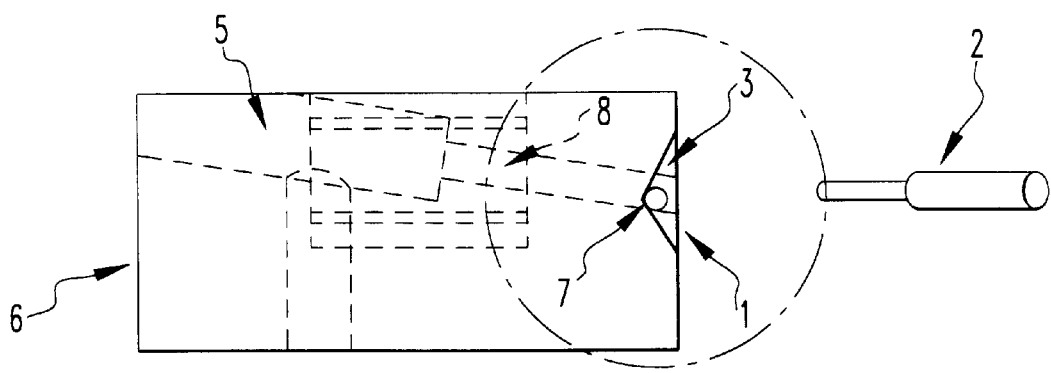
FIG. 2 illustrates a cross-section of the no touch triggering system along line 2—2 of FIG. 1.
Figure 3:
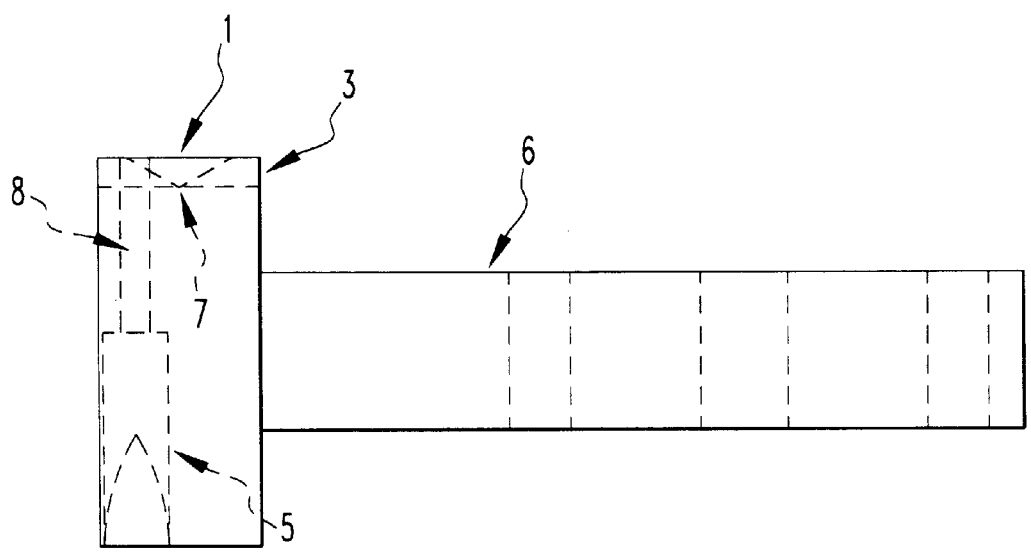
FIG. 3 illustrates a cross-section of the no touch triggering system along line 3—3 of FIG. 1.

As shown in FIG. 2, as the trigger mechanism 2 nears the beam detection location 3 of the target area 1, the reflective or through beam is broken so as to cause a change in state. As shown in FIG. 3, the reflective type fiber optic cable sensor 4 is located off-center from the target area 1 and transmits the light through a reflective channel 8 to the target area 1.

Those skilled in the art will appreciate that the detection beam location 3 is important in relation to the bottom of the target area 1 to assure that the machine is triggered at the proper time for placement of the components to be operated upon by the machine. Improper placement of the detection beam location may cause premature excitation and result in misplaced components. Accordingly, the detection beam location 3 is preferably aligned to coincide with the apex 7 of the cone shaped target area 1 so that the machine is only activated when the trigger mechanism 2 is inserted all the way to the apex 7 of the cone shaped target area 1. Of course, in this case, the trigger mechanism need not be large as no mechanical movement is necessary to trigger the machine.

The size of the cone shaped target area 1 is not as important as the form of the cone. In other words, the cone must be designed so that the trigger mechanism 2 will be guided to the center (apex) 7 of the target area 1. Any deviation from the center (apex) 7 of the target area 1 could cause the machine to be triggered prematurely.

In a preferred embodiment, the trigger system of the invention is implemented in a wire stripping device, where the trigger mechanism 2 is a wire to be stripped. The target area 1 is shaped like a cone with an oblique angle so that wires of a variety of sizes (e.g., 20–36 gauge wire) may be used to trigger the wire stripping device. The cone shaped target area 1 guides the wire to the beam detection location 3 at the center (apex) 7 of the target area 1 so that the wire stripping device will not be activated until the wire is centered in the target area 1 so as to break the light beam at the beam detection location 3, thereby preventing a trigger malfunction. During operation, the target area 1 is located within the wire stripping device so that it cannot be accessed by the operators fingers, thereby preventing the wire stripping device from being activated at a time when the operator's fingers are in harm's way.

Those skilled in the art will appreciate that the arrangement of the invention is independent of the gauge of the wire so long as the target area 1 has a sufficiently oblique cone shape. On the other hand, those skilled in the art will appreciate that the conical shape of the target area 1 generally functions to align the wire so that it is in proper orientation and alignment when the stripper assembly is actuated.

Although the present invention has been described with reference to a couple of exemplary embodiments, it will be understood by those skilled in the art that the invention is not limited to the embodiments specifically disclosed herein. Those skilled in the art also will appreciate that many other variations of the specific embodiments described herein are intended to be within the scope of the invention as defined by the following claims.

What is claimed:

1. A trigger system which automatically triggers operation of an associated machine without direct operator intervention, comprising:

a trigger mechanism comprising a device to be processed by said associated machine;

a housing containing a target area having an opening which tapers to a detection point within said housing, said target area accepting said trigger mechanism at said opening and guiding said trigger mechanism to said detection point; and a light sensor at said detection point which detects the interruption of light at said detection point by said trigger mechanism and sends a trigger signal to activate said associated machine when said interruption is detected.

2. The trigger system of claim 1, wherein said target area is shaped like a cone tapering from said opening to said detection point, side walls of said target area intersecting at an oblique angle at an apex of said cone.

3. The trigger system of claim 2, wherein said oblique angle is approximately 120°.

4. The trigger system of claim 1, wherein said trigger system is placed inside said associated machine so as to be inaccessible to an operator during normal use of said associated machine.

5. The trigger system of claim 1, wherein said associated machine is a wire stripping device and said trigger mechanism is a wire to be stripped.

* * * * *